TWO TERMINAL MONOSTABLE TRANSISTOR SWITCH

Filed Dec. 6, 1954

INVENTOR
R. L. CARMICHAEL
BY W. L. Keefauver
ATTORNEY

United States Patent Office 2,889,510

Patented June 2, 1959

2,889,510

TWO TERMINAL MONOSTABLE TRANSISTOR SWITCH

Robert L. Carmichael, Stanhope, N.J., assignor to Bell Telephone Laboratories, Incorporated, New York, N.Y., a corporation of New York Application December 6, 1954, Serial No. 473,170

18 Claims. (Cl. 320—1)

Figure 1:
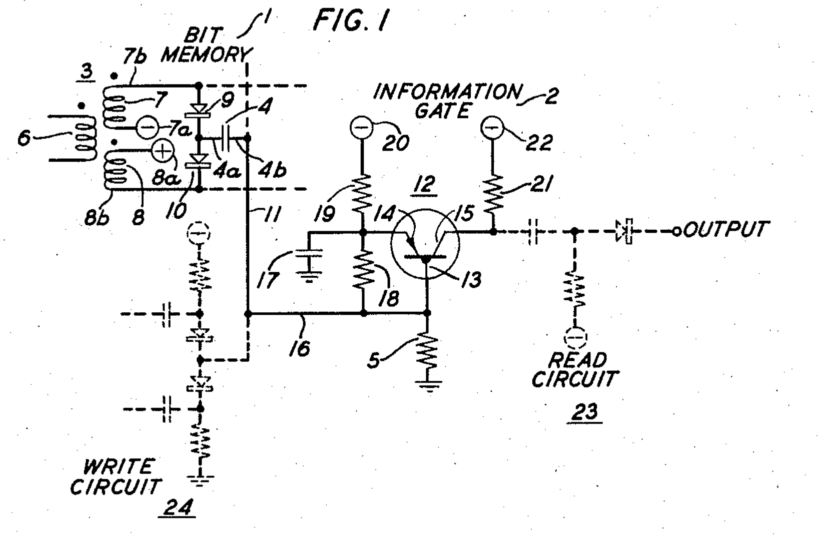

This invention relates to systems for storing information in the form of electrical energy and more particularly to a memory system wherein the information stored can be utilized and then automatically regenerated in the storage device.

A principal object of the invention is to reduce the number of components required to utilize the information stored in a memory network and automatically to restore the level of the energy in the network to its pre-utilization level. A further object of the invention is to improve the duty cycle of a circuit which is capable of automatically reading information out of a capacitive memory circuit and automatically rewriting it therein.

In many systems which represent bits of information by electric pulses, for example telephone dial systems or computer systems, it is frequently necessary to store bits of information for an interval before utilizing them. It is also frequently necessary to use a particular bit of information more than once. In an array of this general type information is stored in a "memory circuit." The storing operation is usually called "writing," and the utilization operation is usually called "reading out." If the same bit of information is to be used more than once it must be rewritten in the memory circuit after each read-out operation if the system is of the type contemplated by the present invention wherein the memory devices stores a charge and the utilization operation tends to dissipate such charge.

In one particular prior art system using a binary code the basic response indicates either the presence of a pulse, a binary pulse bit, or the absence of a pulse, a binary no-pulse bit. The memory circuit comprises a network of bit memory devices arranged in rows and columns to store information in such a code. Any one bit memory device can be designated by the intersection of a particular row with a particular column. Such designation is performed by so called logic circuits external of the memory array in a manner varying with each system. The functioning of such external logic circuits is not a part of this invention. This invention deals more with the co-operative relation between a single memory device and the circuitry for reading out of and rewriting into the memory device a bit of information. This basic unit can then be combined with other similar units as necessary to construct the particular memory array that is desired.

This invention has particular application to bit-memory devices which can store an electric charge and to current amplifying circuits responsive to the discharge of such storage devices for (1) amplifying the discharge pulse to render it more suitable for utilization and (2) generating within each amplifying circuit a potential which can be used directly to recharge the storage device without employing external regeneration circuits. The latter operation is necessary where the memory device stores an electric charge corresponding to a bit of information because the charge is usually at least partially dissipated in utilization. This sort of utilization is called destructive read-out.

Wherever destructive read-out occurs the rewriting operation has heretofore been performed by a separate regeneration circuit that is energized by the read circuit and controlled by the demands of the other parts of the overall system. In carrying out the invention in an illustrative embodiment thereof, however, a regenerative amplifier is connected to one terminal of an information bit storage capacitor in the memory circuit. When the memory circuit is pulsed by a signal from external logic circuits the capacitor tends to discharge through the amplifier circuit. If the pulse is of the proper minimum magnitude it will trigger the amplifier which in turn both energizes the read circuit and automatically regenerates the bit of information for application to the storage capacitor.

Figure 2:
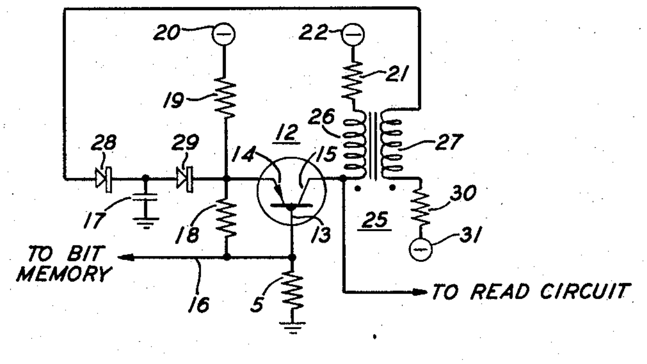
Figures 3, 4:
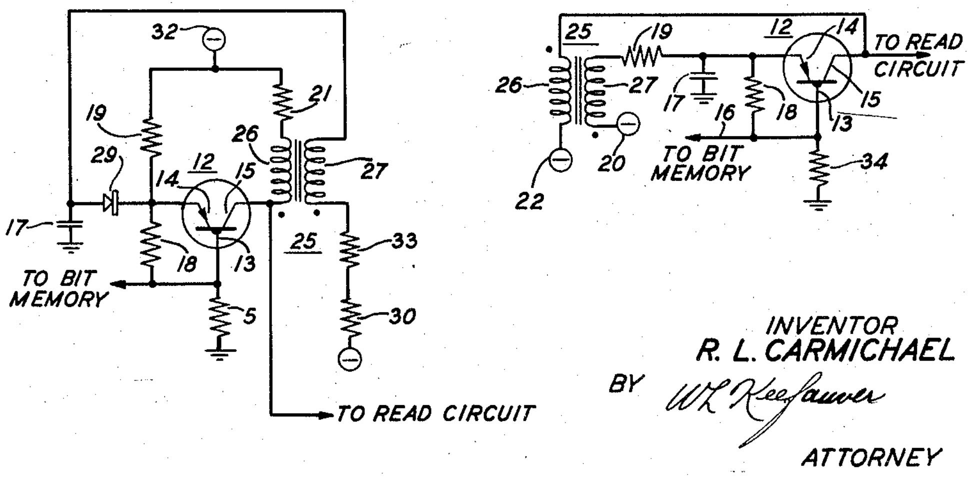

The arrangement and operation of the present invention will be apparent from the following specification including the single sheet of drawings in which Fig. 1 illustrates a bit memory circuit and an information gate in accordance with my invention, and Figs. 2, 3 and 4 illustrate modifications of the information gate which are arranged to provide an improved duty cycle as compared to the gate of Fig. 1.

Referring to Fig. 1, one type of capacitive memory circuit to which the invention can be applied is illustrated and designated bit-memory circuit 1. It should be understood however that this invention can be applied to any memory device wherein electrical energy can be stored and discharged at will. Bit memory circuit 1 is connected to an information gate 2. Selection transformer 3 receives a selection pulse from external logic circuits and causes the energy stored in capacitor 4 to be discharged through the information gate. If the discharge pulse is sufficiently large gate 2 will be triggered, the readout circuit will be energized, and the information bit will be rewritten in capacitor 4. If the pulse is not large enough to trigger gate 2 the read circuit will not be energized and the charge on capacitor 4 will be dissipated in the resistor 5.

Transformer 3 is provided with a primary winding 6 and a pair of secondary windings 7 and 8. Primary winding 6 is energized from suitable external logic circuits, and it is poled so that the upper portion of the primary winding will be of the same polarity as the upper portion of secondary windings 7 and 8 as shown by the dots adjacent the respective windings in Fig. 1. The potential sources *7a* and *8a* of opposite polarities are connected, respectively, to one terminal of each of the windings 7 and 8. The opposite terminals *7b* and *8b* of windings 7 and 8 are connected to the diodes 9 and 10, respectively. The adjacent unlike terminals of diodes 9 and 10 are connected together to terminal *4a* of capacitor 4.

Diodes 9 and 10 and capacitor 4 comprise the bit-memory unit 1. A number of these units can be connected in parallel across secondary windings 7 and 8 to form a row for the storage of a corresponding number of bits of information. Similarly, a plurality of rows can be made up with each having its own selection transformer and a plurality of bit-memory units. In such an application the terminals *4b* of corresponding capacitors 4 would all be connected to the line 11 to form a column. Other memory rows and bit-memory circuits have not been shown since they would only serve to complicate the drawing and they are not necessary for an understanding of this invention.

Information gate 2 can be any monostable amplifier circuit which is stable in its nonconducting state but is so slightly biased in that condition that a small pulse applied to the input terminal will trigger it into its unstable state of conduction. In addition the input terminal of such amplifier, during conduction, must be so transiently biased as to support conduction in the amplifier and to restore the energy level in the memory device. An example of such circuits is the general type of transistor trigger circuit which is described in the co-pending application of A. E. Anderson Serial No. 166,733, filed June 7, 1950, now United States Patent 2,708,720 issued May 17, 1955.

An illustrative embodiment of such circuits is the monostable regenerative, transistor amplifier designated information gate 2. The amplification element is a transistor 12 having a base 13, an emitter 14, and a collector 15. A signal regenerating resistor 5 is connected between base 13 and ground. Lead 16 connects base 13 with line 11. Charging current through capacitor 17, connected between emitter 14 and ground, provides emitter current after the gate has been triggered. Resistor 18, which is connected between base 13 and emitter 14, and resistor 19, which is connected between emitter 14 and a source of electric potential 20, constitute with resistor 5 a potentiometer arrangement for supplying bias potential to base 13 and emitter 14. The bias is such that base 13 is less negative than emitter 14, and the transistor 12 is normally non-conducting until a pulse of sufficient magnitude to trigger gate 2 is applied to base 13. Bias voltage is supplied to collector 15 through the resistor 21 by the source of electric potential 22. It is understood, of course, that by properly proportioning the various impedance elements of the information gate the potential sources 20 and 22 could be replaced by a single source of potential.

Any suitable read circuit 23 is connected to collector 15 to receive information read out of bit memory 1 by gate 2. Any suitable write circuit 24 is provided to cause initially the desired information to be stored in bit memory 1. The read and write circuits are not a part of this invention. The ones shown are merely illustrative and any suitable circuit could be employed.

To initiate the operation of the circuit of Fig. 1 for any of its possible functions, a selection pulse from the external logic circuits must be applied to primary winding 6. This pulse must be of such polarity and magnitude with respect to the quiescent potentials of terminals **7*a* and 8*a* that the junction points between secondary winding 7 and diode 9 and between secondary winding 8 and diode 10 will be driven to ground potential. From this point the condition of the external logic circuits will determine whether (1) any information bit is to be written on capacitor 4, or (2) the information stored in capacitor 4 is to be read out through information gate 2, or (3) the information already stored in capacitor 4** is to be regenerated therein to compensate for leakage.

Assume first that capacitor 4 is charged so that terminal **4*a* is positive with respect to ground. Terminal 4*b* is at the established negative bias potential of base 13. Diodes 9 and 10 are reversely biased by sources 7*a* and 8*a*, respectively, thereby substantially preventing leakage of the charge from capacitor 4**. This charge condition indicates the presence of a pulse in the binary code.

In order to perform a read-out operation, the logic circuits associated with gate 2 must condition read circuit 23 to be responsive to the output of gate 2. A selection pulse is applied to primary winding 6, and the induced voltages in secondary windings 7 and 8 drive terminals **7*b* and 8*b* to ground potential. Since terminal 4*a* is positively biased with respect to ground, as hereinbefore noted, diode 9 remains Off and diode 10 is biased On thereby clamping terminal 4*a* at the potential of terminal 8*b*, ground potential. However, the charge on capacitor 4 cannot change instantaneously so terminal 4*b* is pulled negatively by the amount of the change in potential at terminal 4*a* and thus applies an additional negative bias in the same amount to base 13. Capacitor 4 may tend to discharge toward the potential difference across resistor 5 via a path including terminal 4*a*, diode 10, terminal 8*b*, secondary winding 8, source 8*a*, ground, resistor 5, leads 16 and 11, and terminal 4*b*. However, very little of the charge on capacitor 4 is lost since the potential difference across resistor 5 after transistor 12 has been biased On becomes greater than the potential difference across capacitor 4 thereby almost immediately biasing diode 10 Off again and opening the above-described discharge path. Thus capacitor 4 can discharge during only the instant after diode 10 is biased On while the current regenerative feedback action in gate 2 is building up the potential difference across resistor 5** as hereinafter described.

The above-mentioned additional negative bias on base 13 drives transistor 12 into conduction, and the increased current flow in resistor 5 due to the conduction of transistor 12 tends to drive base 13 further negative and to increase regeneratively the conduction in transistor 12. Base-collector current in transistor 12 flows in a path from base 13 through collector 15, resistor 21, source 22, ground, resistor 5, and back to base 13. The principal transistor current, however, flows in an emitter-collector path comprising emitter 14, collector 15, resistor 21, source 22, ground, capacitor 17, and emitter 14. The current flowing in the emitter-collector path charges capacitor 17 toward the potential of source 22. The current flowing in resistor 21 increases the potential drop thereacross and drives collector 15 positively toward ground producing a positive-going pulse at collector 15. The pulse is read out as a binary pulse by read circuit 23.

The magnitude of capacitor 17 is so proportioned with respect to the conducting impedance of transistor 12 and the combined impedance of resistors 5 and 21 that conduction in transistor 12 will be maintained for an interval which is somewhat longer than the duration of the selection pulse. When the charging current for capacitor 17 flowing in emitter 14 drops below the minimum level at which conduction can be maintained transistor 12 is cut off.

It has been hereinbefore mentioned that, prior to the application of a selection pulse to primary winding 6, terminal **4*a* was at a positive potential with respect to ground and terminal 4*b* was at the negative potential of base 13 with respect to ground. Upon selection, the potential of base 13 is driven negatively by the amount of the positive potential of terminal 4*a* when terminal 4*a* is clamped to ground. Therefore, at the instant of the triggering of transistor 12 the potential difference across resistor 5 is equal to the total voltage charge that was on capacitor 4 just prior to triggering. During the conduction interval of transistor 12 the regeneration effect of base current flowing in signal regenerating resistor 5 drives base 13 more negative thereby tending to cause transistor 12 to conduct harder as hereinbefore described. This increases the potential difference across resistor 5 still further so that with transistor 12 in conduction the total potential drop across resistor 5 is greater than the voltage charge on capacitor 4 just prior to triggering. Furthermore, the total increase in potential difference across resistor 5 is greater than the change in potential at terminal 4*a*** upon selection.

During the selection pulse interval the increased potential difference across resistor 5 establishes a charging current path for capacitor 4 via resistor 5, ground, source **7*a*, winding 7, terminal 7*b*, diode 9, and terminal 4*a*. Capacitor 4 charges toward the potential difference across resistor 5 during the selection interval. The charge on capacitor 4 is regenerated in this manner, and at the end of the selection pulse diodes 9 and 10 are biased Off once more to hold the charge on capacitor 4**.

Transistor 12 is biased Off after the end of the selection pulse and after diodes 9 and 10 are both reversely biased. When transistor 12 is biased Off, its base current is cut off and the potential of base 13, and terminal 4b, with respect to ground decreases in a positive direction to the normal negative bias level of base 13. The change in the potential difference across resistor 5 is equal to the previous increase therein due to triggering and due to current regenerative effects in resistor 5. However, since the charge on capacitor 4 cannot change with both diodes 9 and 10 reversely biased, the potential of terminal 4a with respect to ground is driven in a positive direction by the same amount as the change in potential at terminal 4b. Now the potential difference across capacitor 4 is larger than it was at the time of the initiation of the selection pulse, and the potential of terminal 4a with respect to ground is positive. Thus, the information stored in capacitor 4 has been read out and it has also been regenerated therein by the same circuitry, and with increased magnitude, to compensate for leakage through diodes 9 and 10 between selection pulses.

Considering a specific example by way of illustration of a typical operation, and without limiting the invention to specific proportions, the following circuit component values have been found to comprise a circuit that operates as hereinbefore described:

4-volt selection pulses
Source 7a=−4 v.
Source 8a=+4 v.
Source 20=−26 v.
Source 22=−14 v.
C4=500 micromicrofarads
C17=3000 micromicrofarads
R5=3000 ohms
R18=3000 ohms
R19=82,000 ohms
R21=1600 ohms With the above-listed circuit component values, and just prior to the application of a selection pulse to winding 6, base 13 and terminal 4b are about −1 volt with respect to ground, emitter 14 is at about −2 volts, and collector 15 is at about −12 volts. The potential difference across capacitor 4 is about 4 volts so terminal 4a is at about +3 olts with respect to ground. The 4-volt selection pulse drives terminals 7b and 8b to ground potential thereby biasing diode 10 On, clamping terminal 4a at ground potential, and driving base 13 three volts more negatively to about −4 volts with respect to ground.

The change in potential at base 13 biases transistor 12 into conduction, and base current flow ultimately pulls base 13 down to about −5 volts. Capacitor 4 charges via diode 9 toward the 5-volt potential difference across resistor 5 during the selection pulse interval. Capacitor 17 charges from −2 volts toward the −14 volt potential of source 22 until its charging current is sufficiently reduced to cut off transistor 12. Base current flow in transistor 12 is cut off thereby restoring the potential of base 13 and terminal 4b to −1 volt, a change in the positive direction of 4 volts. The potential of terminal 4a also changes about 4 volts in a positive direction leaving the potential of terminal 4a at about +4 volts with respect to ground with transistor 12 Off. During the interval between selection pulses some charge leaks off capacitor 4 through diodes 9 and 10, and at the time of the next succeeding selection pulse the total potential difference across capacitor 4 may have been reduced to about 4 volts. Thus the increasing negative potential on base 13 during current regenerative action in information gate 2 also results in the regeneration of the charge on capacitor 4. Enough of the regenerated charge on capacitor 4 will be held thereon to trigger transistor 12 is response to a subsequent selection after the instant selection pulse has terminated because diodes 9 and 10 will then be biased beyond cutoff by virtue of the negative and positive potentials applied respectively to windings 7 and 8.

If the voltage charge stored in capacitor 4 is of insufficient amplitude, or of improper polarity, to cause the triggering of information gate 2 in response to the application of a selection pulse to transformer 3, then the information stored in capacitor 4 represents the absence of a pulse in the binary code. Since gate 2 is not triggered into conduction, read circuit 23 reads a binary "no pulse" during the selection pulse interval.

When it is desired to regenerate the binary information stored in capacitor 4 the external logic circuits must render read circuit 23 and write circuit 24 non-responsive. Then, a selection pulse biases one of the diodes 9 and 10 On thereby clamping terminal 4a at ground potential. If a binary pulse bit is stored in capacitor 4 transistor 12 is triggered into conduction thereby regenerating the charge on capacitor 4 in the manner hereinbefore described. Of course if a binary no-pulse bit is stored in capacitor 4, transistor 12 remains Off and no regeneration takes place.

To write information into capacitor 4 a pulse of the appropriate polarity, as hereinafter described, is applied to write circuit 23 coincident with the application of a selection pulse to transformer 3. During such a write operation the external logic circuits must render read circuit 23 non-responsive to the output of gate 2.

In order to write a binary pulse bit into capacitor 4, a negative pulse of sufficient amplitude to override any voltage pulse that may be stored in capacitor 4 is applied to base 13 via write circuit 24 to trigger gate 2. The effect of regenerative current flow in resistor 5 causes a charge to be stored in capacitor 4, with terminal 4a being positive with respect to terminal 4b, in the manner hereinbefore described in connection with reading out a binary pulse bit.

The binary information represented by the absence of a pulse is indicated by the presence in capacitor 4 of any charge that is of insufficient magnitude or of the wrong polarity, to trigger transistor 12. To write binary information represented by the absence of a binary pulse bit, a positive pulse of sufficient magnitude to overcome any charge on capacitor 4 is applied to terminal 4b from write circuit 24 coincident with the application of a selection pulse to primary winding 6. The incidence of a selection pulse in primary winding 6 for this write operation, simultaneously with a positive write pulse at terminal 4b, causes capacitor 4 to discharge through diode 10, winding 8, source 8a, ground and write circuit 24. Since base 13 is positively biased with respect to ground, transistor 12 is not triggered, there is no regeneration, and capacitor 4 is charged toward the potential of the positive write pulse.

Upon the termination of the selection pulse and the positive write pulse, terminal 4b is restored to the normal negative bias potential of base 13, i.e., its potential is driven negatively. Terminal 4a, which was at ground potential during the selection interval, is also driven negatively by the same amount; and the remaining charge on capacitor 4 is such that terminal 4b is more positive than terminal 4a. Thus a binary no-pulse bit is stored in capacitor 4.

Each subsequent selection pulse after the positive write pulse pulls terminal 4a positively to ground potential and also causes terminal 4b and base 13 to be pulled positively thereby biasing transistor 12 further beyond cutoff and partially discharging capacitor 4 toward the normal biasing potential difference across resistor 5. Accordingly, when capacitor 4 has a charge stored therein corresponding to the absence of a binary pulse, it has no voltage available for triggering transistor 12; and the possibility of leakage building up a charge on capacitor 4 capable of triggering transistor 12 will be reduced.

In the information gate shown in Fig. 1, capacitor 17 is initially charged negatively to the level of the potential drop appearing across resistors 5 and 18. When a pulse drives base 13 sufficiently negative to trigger transistor 12 into conduction, the potential of emitter 14 cannot change immediately because capacitor 17 is connected thereto. Therefore, emitter 14 draws current through capacitor 17; and capacitor 17 is charged toward a greater negative potential from source 22 through emitter 14, collector 15 and resistor 21. When capacitor 17 becomes sufficiently charged to put a negative bias on emitter 14 that corresponds substantially to the negative bias on base 13 due to the regenerative effect of current flow in resistor 5, transistor 12 will be cut off and capacitor 17 will discharge to its quiescent condition through resistors 5 and 18. This operation has been hereinbefore described in connection with the readout of binary pulse bits from capacitor 4.

The time necessary for capacitor 17 to become discharged after a conduction interval is quite large compared to the usual memory circuit duty-cycle requirements. Since transistor 12 depends on the charging current through capacitor 17 to supply emitter current conduction, the duty cycle of information gate 2 is necessarily a function of the time constant of the discharging circuit for capacitor 17. It has been found that this duty cycle can be substantially improved by providing inductive feedback to discharge capacitor 17 after transistor 12 is biased off, as shown in Figs. 2, 3 and 4 of the drawings wherein circuit elements corresponding to those of Fig. 1 are designated by the same numerals.

Considering first the circuit of Fig. 2, a transformer 25 is provided to supply the inductive feedback. Primary winding 26 of transformer 25 is connected between collector 15 and current limiting resistor 21. Secondary winding 27 of transformer 25 has one terminal thereof connected to emitter 14 through serially arranged diodes 28 and 29. The other terminal of secondary winding 27 is connected through current-limiting resistor 30 to a source of negative potential 31. Primary winding 26 and secondary winding 27 are arranged so that the terminal of primary winding 26 which is connected to collector 15 will be of the opposite polarity to the terminal of secondary winding 27 which is connected to diode 28. Lead 16 connects base 13 to bit-memory circuit 1 as described in connection with Fig. 1. The read circuit is connected to the output of transistor 12 at collector 15.

Diode 28 blocks conduction in the feedback circuit from secondary winding 27 during the interval when transistor 12 is conducting and permits feedback of potentials which tend to restore capacity 17 to its quiescent charge after transistor 12 has been cut off. Similarly diode 29 prevents capacitor 17 from discharging through resistors 5 and 18 and falsely triggering transistor 12. Resistor 30 limits the overshoot current so capacitor 17 does not become positively charged. Potential source 31 is of approximately the same value as the quiescent bias on emitter 14 so that capacitor 17 cannot discharge to a more positive potential than emitter 14 in the quiescent state and falsely trigger transistor 12.

The operation of the gate 2 in Fig. 2 is initiated in the same way that the information gate 2 of Fig. 1 was triggered. When transistor 12 has been triggered the collector current flowing in primary winding 26 causes a positive pulse to appear in the read circuit 23. This current also causes the emitter end of winding 27 to be more negative than the other end thereof with the result that diode 28 in the feedback circuit will be reversely biased so that there will be no feedback. When transistor 12 is cut off the inductive overshoot in transformer 25 causes the potential at the terminal of winding 27 which is connected to diode 28 to be driven positively. Diode 28 conducts and reduces the negative charge on capacitor 17. Emitter 14 returns to its quiescent bias potential at the same time thereby reversely biasing diode 29 to prevent capacitor 17 from discharging through resistors 5 and 18.

The circuit of Fig. 3 is a further modification of the information gate 2. Here potential sources 20 and 22 have been replaced by a single source 32 as suggested above in connection with Fig. 1. In addition, diode 28 has been eliminated. Without diode 28 in the circuit, some emitter current is supplied by secondary winding 27 as soon as transistor 12 starts to conduct. Resistor 33 has been added to the circuit of secondary winding 27 to replace the forward impedance of diode 28 that has been removed. Otherwise the circuit operation is the same as that of Fig. 2.

In Fig. 4 there is shown still another modification of this invention wherein resistors 5, 30 and 33 have been lumped into one resistor 34 connected between base 13 and ground. This further reduces the number of components necessary for the operation of this information gate but it renders the proportioning of the circuit elements more critical because no diodes are used to avoid false triggering.

Although various circuit modifications have been shown and described, it is understood that many other changes which are within the true spirit and scope of this invention as defined in the appended claims will be apparent to those skilled in the art.

What is claimed is:

1. In combination a regenerative amplifier comprising a transistor having base, collector and emitter terminals, circuit means supplying bias potentials to said collector and emitter terminals for normally biasing said transistor in a stable state of non-conduction, a current feedback resistor connected between said base terminal and ground, a capacitor having one terminal thereof connected to said base terminal for storing charges representing information in a binary code, only one of said charges being of sufficient magnitude to produce a pulse capable of triggering said amplifier upon discharge of said capacitor, and control means connected to the other terminal of said capacitor for causing said capacitor to be discharged through said current feedback resistor thereby the discharge of said one charge producing a pulse for driving said transistor into conduction and causing said one charge to be restored in said capacitor.

2. In combination a monostable regenerative amplifier having a stable state of non-conduction and an unstable state of conduction and comprising a transistor having base, collector and emitter terminals, bias circuit means connected to said collector and emitter terminals normally biasing said transistor in said stable state of non-conduction, a signal regenerating resistor connected between said base terminal and ground, an information pulse storage capacitor having one terminal thereof connected to said base terminal, and control means connected to the other terminal of said capacitor for causing said capacitor to be discharged through said signal regenerating resistor to trigger said transistor into said unstable state of conduction whereby current feedback in said signal regenerating resistor restores the charge in said storage capacitor.

3. The combination recited in claim 2 wherein a further capacitor is connected between said emitter terminal and ground, at least a part of said bias circuit means being responsive to the triggering of said amplifier for supplying charging current to said capacitor via said emitter until said further capacitor becomes so charged that it cannot supply sufficient current to said emitter to maintain conduction in said transistor.

4. In the combination recited in claim 3 an inductive feedback path coupling said collector to said emitter.

5. In the combination recited in claim 3 an inductive feedback path coupling said collector to said emitter, and means for damping inductive overshoot in at least a part of said feedback path, the last-mentioned means comprising a unilaterally conducting impedance element serially connected in said feedback path between said storage capacitor and said emitter terminal and poled to oppose conduction during a portion of said inductive overshoot.

6. In an electric pulse storage system an information gate comprising a regentrative amplifier having an unstable conducting condition and a stable non-conducting condition, said amplifier including a transistor having base, emitter, and collector terminals, a capacitor connected between said emitter terminal and ground, a first and a second source of bias potential, a feedback circuit comprising a transformer having a primary and a secondary winding, first circuit means serially connecting said primary winding between said collector terminal and said first source of bias potential, second circuit means serially connecting said secondary winding between said second source of bias potential and said emitter terminal, said primary and secondary windings so wound that the collector end of said primary winding and the emitter end of said secondary winding are of the opposite relative polarity, and rectifier means serially connected between said secondary winding and said emitter terminal, said rectifier means so poled that it will be biased reversely when said transistor is conducting and forwardly immediately after said transistor reverts to its non-conducting condition.

7. In a system which is responsive to the application of a selection pulse thereto for storing and utilizing information in the form of the presence or absence of a pulse of a predetermined polarity and of a predetermined minimum magnitude, the combination of a device for storing voltage charges, a circuit for controlling the storage and utilization of charges in said device, said circuit including means for receiving a selection pulse to actuate said circuit for enabling the storage of a charge in said device and the release of a charge from said device in the form of a voltage pulse, an amplifier having at least one terminal, a connection between one terminal of said device and said one terminal of said amplifier, means for connecting said control circuit to another terminal of said device, said amplifier including a resistor connected to said one terminal of said amplifier for providing current regenerative feedback therein, means for normally biasing said amplifier in a nonconducting condition in the absence of a voltage pulse of said predettrmined polarity and minimum magnitude, means including said connection applying said voltage pulse to said one terminal of said amplifier, a voltage pulse of said predetermined magnitude and polarity at said one terminal of said amplifier biasing said amplifier into conduction, means in said amplifier for biasing said amplifier beyond cut-off a predetermned time after it has been biased into conduction, and means including said connection and said resistor for regenerating in said device a charge of sufficient magnitude to produce a pulse of said predetermined polarity and having a magnitude at least as great as said predetermined minimum magnitude.

8. The system in accordance with claim 7 in which said device is a capacitor, said connection comprises a metallic lead connected between one terminal of said capacitor and said one amplifier terminal, said resistor is connected between said one amplifier terminal and ground, and said circuit comprises means for clamping another terminal of said capacitor at ground potential in response to the application of a selection pulse to said circuit thereby changing the potential with respect to ground of said one terminal of said amplifier by an amount corresponding to the change in potential of said another terminal of said capacitor upon being clamped at ground potential.

9. The combination in accordance with claim 5 which comprises in addition means for utilizing the inductive overshoot in said feedback path upon the termination of conduction in said transistor for discharging said further capacitor, and the last-mentioned means comprising a unilaterally conducting impedance element serially connected in said feedback path and poled for forward conduction during said inductive overshoot.

10. The information storing and utilizing system in accordance with claim 8 in which said clamping means comprises a transformer having a primary winding and two secondary windings, two sources of potential connected between ground and one terminal of each of said secondary windings, respectively, said two sources being poled for conduction in opposite directions with respect to ground, two diodes connected in series between the other terminals of each of said two secondary windings, said diodes being poled for forward conduction in opposition to said two potential sources, and means for connecting a terminal common to said two diodes to said another terminal of said capacitor, said primary and secondary windings being poled so that the reception of said selection pulse in said primary winding induces voltages in said secondary windings for biasing one of said diodes into conduction.

11. The information storing and utilizing system in accordance with claim 7 in which said amplifier comprises a transistor having a base electrode, a collector electrode, and an emitter electrode, means for connecting said resistor between said base electrode and ground, said normally biasing means comprises means for supplying operating potential, and means for connecting said supply means to said collector and emitter electrodes normally to bias said amplifier in a nonconducting condition, said cut-off biasing means comprises a capacitor connected between said emitter electrode and ground for biasing said amplifier beyond cut-off a predetermined time after it has been biased into conduction, and said supply means charging said capacitor during said predetermined time via a charging current path comprising said emitter and collector electrodes, at least a part of said supply means, and ground.

12. The information storing and utilizing system in accordance with claim 1 which further comprises readout means connected to said collector electrode for receiving therefrom a pulse in response to the biasing of said amplifier into conduction, and write means connected to said base electrode for selectably applying to said base pulse of a first polarity to trigger said amplifier into coneelctrode coincident with said selection pulse either a duction for generating a charge of said first polarity in said capacitor or a pulse of the opposite polarity for biasing said amplifier Off and storing a charge of said opposite polarity in said capacitor.

13. The information storing and utilizing system in accordance with claim 11 in which said amplifier comprises means for coupling said collector electrode to said capacitor for discharging said capacitor after said predetermined time.

14. The information storing and utilizing system in accordance with claim 13 which further comprises a source of potential, said coupling means comprising a transformer having a primary winding connected between said collector electrode and said supply means and a secondary winding, means for connecting said secondary winding in series with said source between the terminals of said capacitor, the last-mentioned means comprising a first diode connected between said secondary winding and said capacitor and poled for forward conduction in response to the voltage induced in said secondary winding upon the biasing of said amplifier beyond cut-off at the end of said predetermined time, and said means for connecting said capacitor to said emitter electrode comprises a second diode connected in series therebetween and poled for forward conduction of current flowing in said charging current path.

15. The information storing and utilizing system in accordance with claim 13 in which said coupling means comprises a transformer having a primary winding and a secondary winding, said primary winding connected between said collector electrode and said supply means, and means for connecting said secondary winding between the terminals of said capacitor for discharging said capacitor in response to the biasing of said amplifier beyond cut-off.

16. The information storing and utilizing system in accordance with claim 15 in which the means for connecting said secondary winding between the terminals of said capacitor comprises a direct wire connection between one terminal of said secondary winding and said capacitor, and a source of potential connected between another terminal of said secondary winding and ground, and said means for connecting said capacitor to said emitter electrode comprises a diode connected between said capacitor and said emitter electrode, said diode being poled for forward conduction of current flowing in said charging current path.

17. The information storing and utilizing system in accordance with claim 13 in which said coupling means comprises a transformer having a primary winding and a secondary winding, and said means for connecting said supply means to said collector and emitter electrodes comprises said primary winding connected between said supply means and said collector electrode, and means connecting said secondary winding in series between said supply means and said emitter electrode.

18. The information storing and utilizing system in accordance with claim 17 in which said means for normally biasing said amplifier in a nonconducting condition comprises a terminal of said potential supply means connected to ground, a bias resistor connected between said emitter and base electrodes, and a potential divider comprising said bias resistor and said regenerative feedback resistor for establishing said emitter electrode at a normally non-conducting bias potential with respect to the potential at said base electrode.

References Cited in the file of this patent

UNITED STATES PATENTS

| | | |
|---|---|---|
| 2,480,795 | Wagner | Aug. 30, 1949 |
| 2,491,382 | Lee | Dec. 13, 1949 |
| 2,507,226 | Siezen | May 9, 1950 |
| 2,629,834 | Trent | Feb. 24, 1953 |
| 2,670,445 | Felker | Feb. 23, 1954 |
| 2,676,271 | Baldwin | Apr. 20, 1954 |
| 2,695,397 | Anderson | Nov. 23, 1954 |
| 2,695,398 | Anderson | Nov. 23, 1954 |
| 2,771,575 | Hampton | Nov. 20, 1956 |

FOREIGN PATENTS

| | | |
|---|---|---|
| 113,839 | Australia | Sept. 10, 1941 |

UNITED STATES PATENT OFFICE

CERTIFICATE OF CORRECTION

Patent No. 2,889,510 June 2, 1959

Robert L. Carmichael

It is hereby certified that error appears in the printed specification of the above numbered patent requiring correction and that the said Letters Patent should read as corrected below.

Column 1, line 42, for "devices" read -- device --; column 5, line 44, for "olts" read -- volts --; line 73, for "is response" read -- in response --; column 6, line 24, for "to write circuit 23 coincident" read -- to the write circuit coincident --; column 8, line 38, for "resistor thereby" read -- resistor, --; column 10, line 38, for the claim reference numeral "1" read -- 11 --; lines 43 and 44, for "pulse of a first polarity to trigger said amplifier into con- eelctrode coincident with said selection pulse either a" read -- electrode coincident with said selection pulse either a pulse of a first polarity to trigger said amplifier into con- --.

Signed and sealed this 17th day of November 1959.

(SEAL)
Attest:

KARL H. AXLINE
Attesting Officer

ROBERT C. WATSON
Commissioner of Patents